United States Patent
Mayer et al.

(10) Patent No.: US 11,753,076 B2
(45) Date of Patent: Sep. 12, 2023

(54) AUTOMATED HITCHING SYSTEM WITH SUBJECT TRAILER SELECTION FROM MULTIPLE IDENTIFIED TRAILERS

(71) Applicant: Ford Global Technologies, LLC, Dearborn, MI (US)

(72) Inventors: Kenneth Michael Mayer, Ypsilanti, MI (US); Seyed Armin Raeis Hosseiny, Canton, MI (US); Bo Bao, Bloomfield, MI (US); Luke Niewiadomski, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 305 days.

(21) Appl. No.: 17/030,590

(22) Filed: Sep. 24, 2020

(65) Prior Publication Data

US 2021/0009205 A1    Jan. 14, 2021

Related U.S. Application Data

(63) Continuation of application No. 16/184,437, filed on Nov. 8, 2018, now Pat. No. 10,829,152.

(51) Int. Cl.
*B62D 15/02* (2006.01)
*B60R 1/00* (2022.01)
*B60D 1/36* (2006.01)

(52) U.S. Cl.
CPC ............. *B62D 15/025* (2013.01); *B60D 1/36* (2013.01); *B60R 1/00* (2013.01); *B60R 2300/808* (2013.01)

(58) Field of Classification Search
None
See application file for complete search history.

(56) References Cited

U.S. PATENT DOCUMENTS

| | | | |
|---|---|---|---|
| 9,696,723 B2 | 7/2017 | Zeng et al. | |
| 2015/0115571 A1 | 4/2015 | Zhang et al. | |
| 2016/0023601 A1 | 1/2016 | Windeler | |
| 2016/0052548 A1 | 2/2016 | Singh et al. | |
| 2016/0375831 A1* | 12/2016 | Wang | B62D 15/0295 348/148 |
| 2018/0029429 A1 | 2/2018 | Janardhana et al. | |
| 2019/0339704 A1 | 11/2019 | Yu et al. | |
| 2019/0340787 A1 | 11/2019 | Ramirez Llanos | |
| 2020/0039517 A1 | 2/2020 | Berkemeier et al. | |
| 2020/0148258 A1 | 5/2020 | Mayer et al. | |

* cited by examiner

*Primary Examiner* — Tamara L Weber

(74) *Attorney, Agent, or Firm* — Lorne Forsythe; Price Heneveld LLP

(57) ABSTRACT

A vehicle hitching assistance system includes a controller acquiring image data from the vehicle and identifying a plurality of trailers within in a specified area of the image data. The specified area is less than a total field of the image data and corresponds at least with left and right steering angle limits of the vehicle. The controller further receives a selection of a subject trailer of the plurality of trailers identified within the specified area, identifies a coupler of the subject trailer, and outputs a steering signal to the vehicle to cause the vehicle to steer to align a hitch ball of the vehicle with the coupler of the subject trailer.

20 Claims, 13 Drawing Sheets

AUTOMATED HITCHING SYSTEM WITH SUBJECT TRAILER SELECTION FROM MULTIPLE IDENTIFIED TRAILERS

CROSS-REFERENCE TO RELATED APPLICATION

The present application is a continuation of U.S. patent application Ser. No. 16/184,437, now U.S. Pat. No. 10,829,152, filed on Nov. 8, 2018, and entitled "AUTOMATED HITCHING SYSTEM WITH SUBJECT TRAILER SELECTION FROM MULTIPLE IDENTIFIED TRAILERS," the entire disclosure of which is incorporated herein by reference in its entirety.

FIELD OF THE INVENTION

The present invention generally relates to a vehicle hitch assistance system. In particular, the system provides the user with an indication of multiple identified trailers and the ability to select one of the identified trailers as the subject trailer of an automated hitching operation.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the disclosure, a vehicle hitching assistance system includes a controller acquiring image data from the vehicle, identifying a plurality of trailers within the image data, receiving a selection of a subject trailer of the plurality of trailers, identifying a coupler of the subject trailer, and outputting a steering signal to the vehicle to cause the vehicle to steer to align a hitch ball of the vehicle with the coupler of the subject trailer.

Embodiments of the first aspect of the disclosure can include any one or a combination of the following features or aspects:

the controller may further output a video image displayable on a human-machine interface within the vehicle including the image data and a plurality of graphic trailer identification images overlaid on the image data in respective positions adjacent each of the plurality of trailers;

the video image may further include a plurality of graphic trailer selection buttons overlaid on the image data in respective positions adjacent each of the plurality of graphic trailer identification images;

the controller may receive an input from the human-machine interface corresponding with a user input associated with one of the plurality of trailer selection buttons, such input being received as the selection of the subject trailer;

the controller may receive an input from the human-machine interface corresponding with a user input associated with one of the plurality of trailer identification images, such input being received as the selection of the subject trailer;

the controller may identify the plurality of trailers in a specified area of the image data, the specified area being less than a total field of the image data;

the controller may acquire the image data from an imaging system included with the vehicle, the imaging system having at least one camera, the total field of the image data corresponding with a total field of view of the at least one camera;

the specified area of the image data may be a target area disposed within a central portion of the image data;

the controller may further output a video image displayable on a human-machine interface within the vehicle including the image data and a graphic overlay of the specified area on the image data in a proportionally correlated manner;

the controller may receive an input from the human-machine interface corresponding with a portion of the image data outside of the specified area; and the selection of the subject trailer and may includes in the graphic overlay an instruction to reposition the vehicle so that an indicated trailer is within the specified area; and the controller may output the steering signal to a steering system included with the vehicle and may derive the steering signal based on at least a maximum steering angle of the steering system.

According to another aspect of the disclosure, a hitching assistance system for a vehicle includes a controller acquiring image data from the vehicle and identifying a plurality of trailers within in a specified area of the image data. The specified area is less than a total field of the image data and corresponds at least with left and right steering angle limits of the vehicle. The controller further receives a selection of a subject trailer of the plurality of trailers identified within the specified area, identifies a coupler of the subject trailer, and outputs a steering signal to the vehicle to cause the vehicle to steer to align a hitch ball of the vehicle with the coupler of the subject trailer.

According to another aspect of the disclosure, a vehicle includes a steering system, a camera positioned on an exterior of the vehicle, and a controller acquiring image data from the camera and identifying a plurality of trailers within in a specified area of the image data. The specified area is less than a total field of the image data and corresponding at least with left and right steering angle limits of the vehicle. The controller further receives a selection of a subject trailer of the plurality of trailers and outputs a steering signal to the vehicle steering system to align a hitch ball of the vehicle with a coupler of the subject trailer.

According to another aspect of the disclosure, a method for assisting a vehicle in hitching with a trailer includes acquiring image data for a field of view away from a rear of the vehicle and identifying a plurality of trailers within in a specified area of the image data. The specified area is less than a total field of the image data and corresponds at least with left and right steering angle limits of the vehicle. The method further includes receiving a selection of a subject trailer of the plurality of trailers and outputting a steering signal to the vehicle steering system to an align a hitch ball of the vehicle with a coupler of the subject trailer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
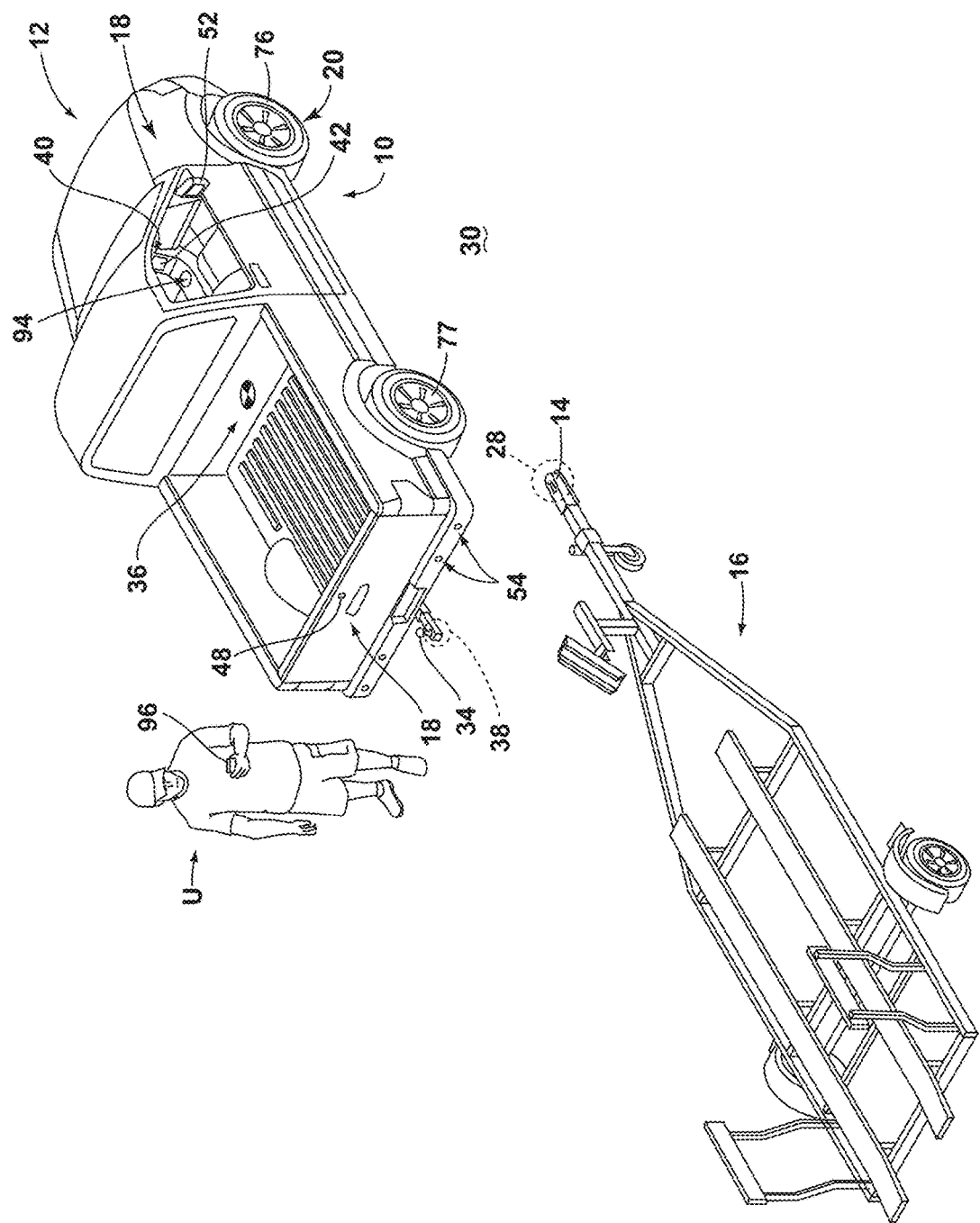
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
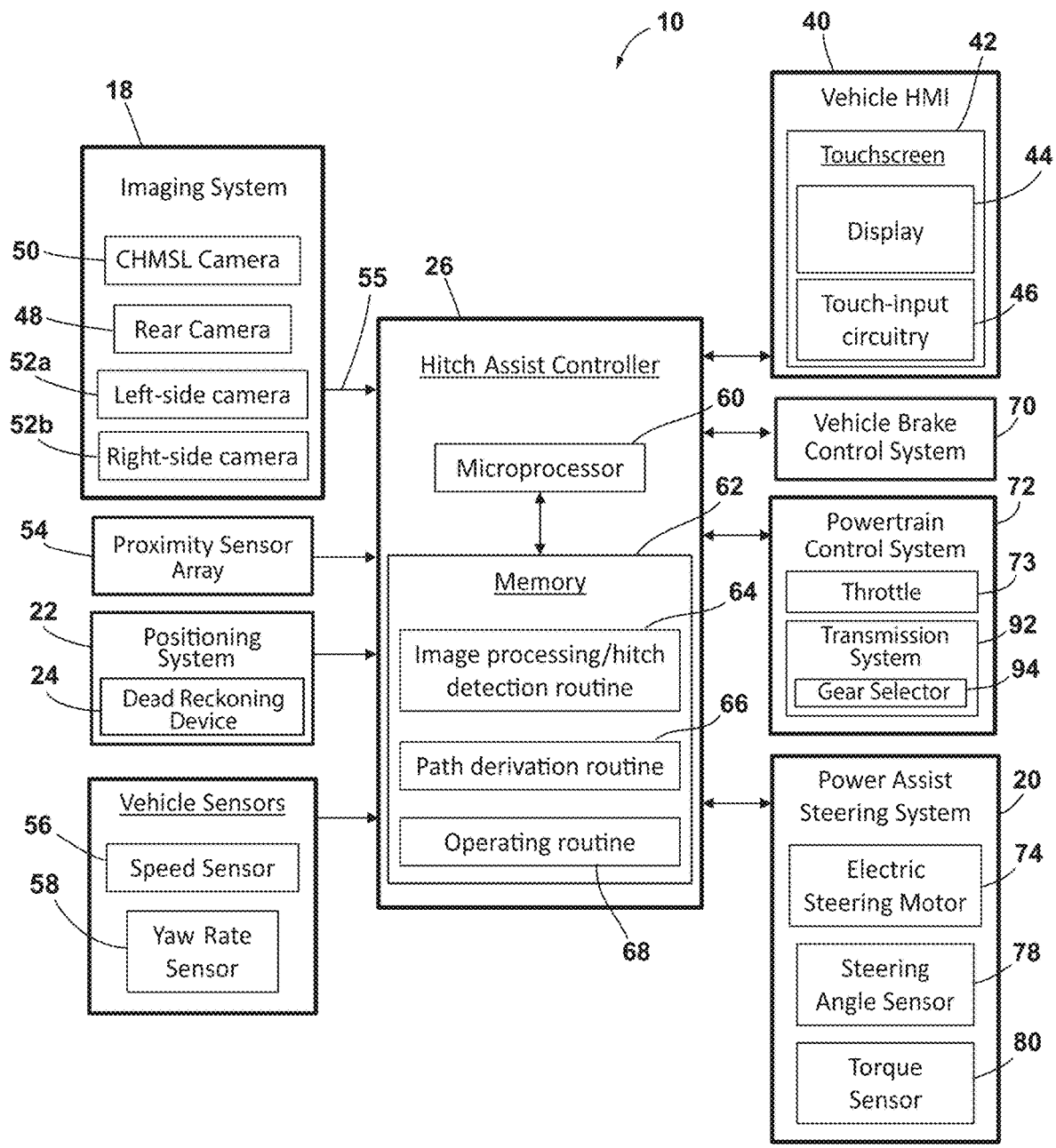
FIG. 2 is a diagram of a system according to an aspect of the disclosure for assisting in aligning the vehicle with a trailer in a position for hitching the trailer to the vehicle.

Referring generally to FIGS. 1 and 2, reference numeral 10 designates a hitch assistance system (also referred to as a "hitch assist" system) for a vehicle 12. In particular, hitch assistance system 10 includes a controller 26 a controller acquiring image data 55 from the vehicle 12 and identifying a trailer 16 within a specified area 45 of the image data 55 and then identifying a coupler 14 of the trailer 16, the specified area 45 being less than a total field 53 of the image data 55. The controller 26 further outputs a steering signal to the vehicle 12 to cause the vehicle 12 to steer to align a hitch ball 34 of the vehicle 12 with the coupler 34.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle $\delta$. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $\alpha_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle $\delta$. In the illustrated embodiment, the power assist steering system 20 is an electric power-assisted steering ("EPAS") system including electric steering motor 74 for turning the steered wheels 76 to a steering angle $\delta$ based on a steering command, whereby the steering angle $\delta$ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
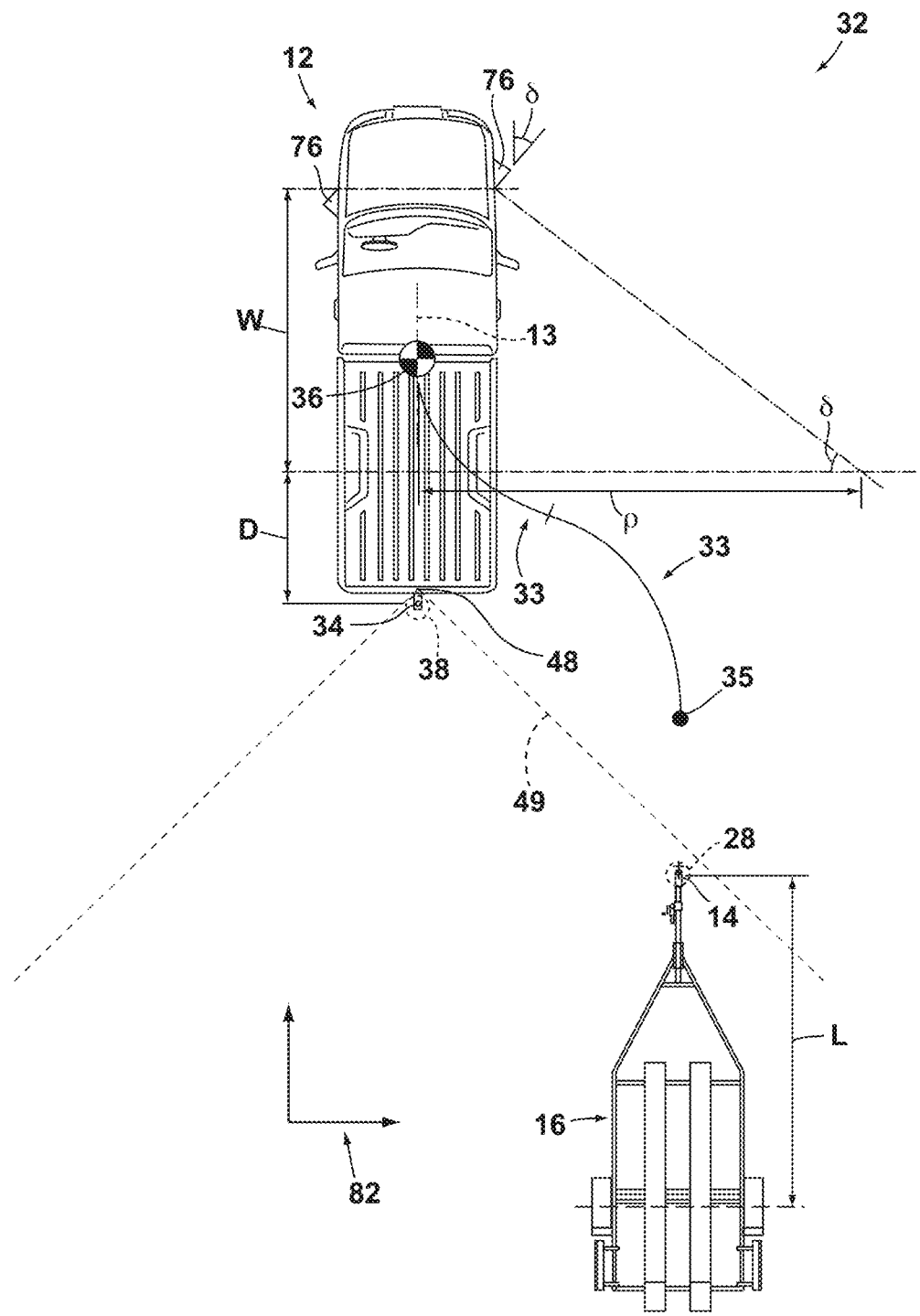
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate A, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52*a* and 52*b*, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which in the depicted arrangement include fields of view 49, 51, 53a, and 53b to correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view of camera 48, as well as other available cameras 48, 50, 52a, 52b, including any objects (obstacles that may include additional trailers 16, as discussed further below, or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

Figure 5:
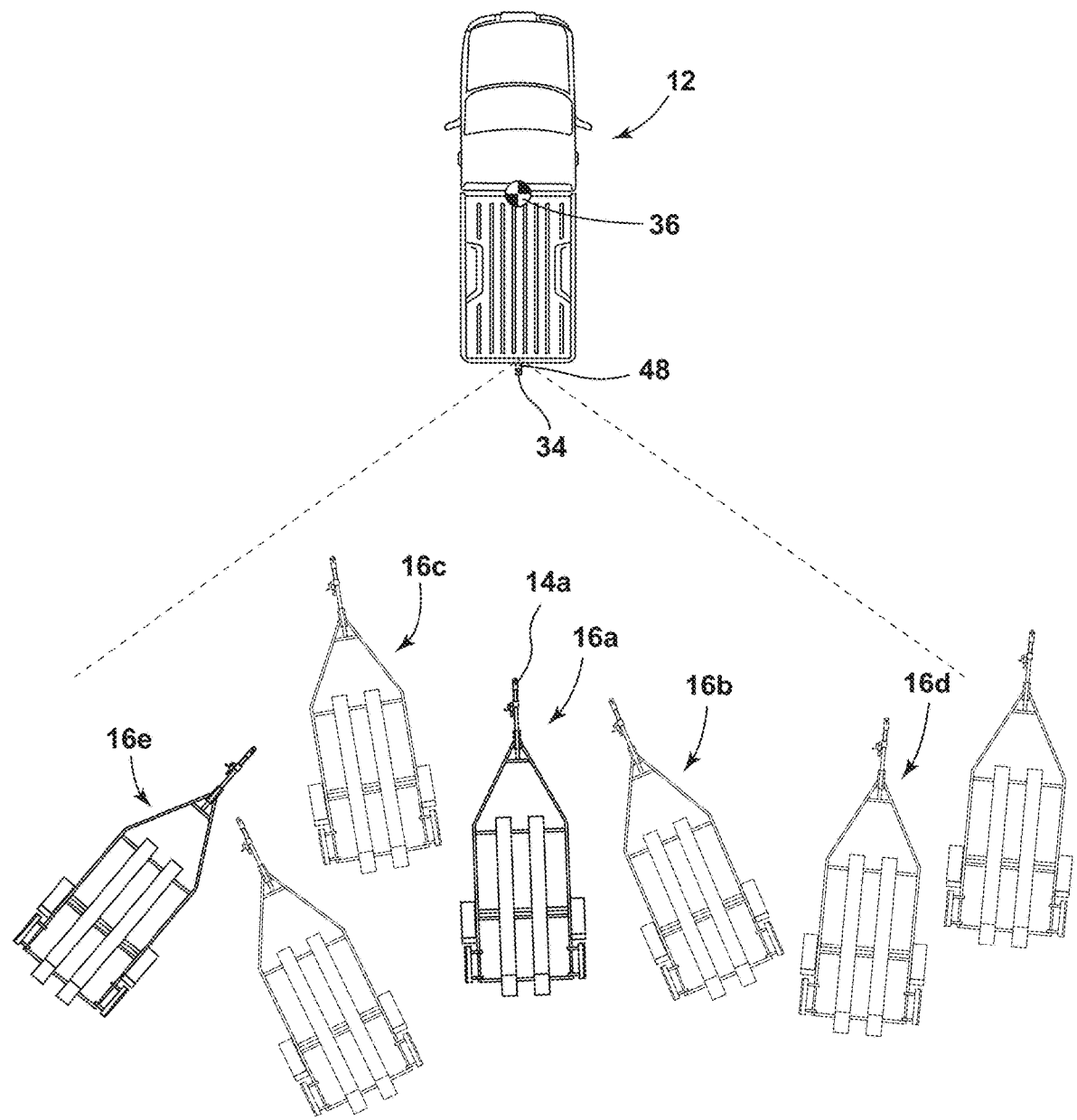
FIG. 5 is an overhead schematic view of a plurality of trailers positioned adjacent a vehicle with multiple ones of such trailers in a field of view of a camera associated with the vehicle.

As shown in FIG. 5, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 12. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction. In various examples, such as when the length L of trailer 16 is known, the angular range may be greater, when permitted, or may be less, depending on the desired tolerance of system 10.

When collected, the position information can then be used in light of the position 28 of coupler 14 within the field of view of the image data 55 to determine or estimate the height $H_c$ of coupler 14. Once the positioning $D_c$, $\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14, as discussed further below.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \qquad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \qquad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction away from its axle by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12 to bring hitch ball 34 into the above-described offset alignment with coupler 14. It is noted that variations in the depicted path 32 may be used. It is further noted that the estimates for the positioning $D_c$, $α_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. It is further noted that, until such a determination can be made, the dead reckoning device 24 can be used to track the location of vehicle 12 in its movement along path 32 toward the initially-derived endpoint 35.

Figure 4:
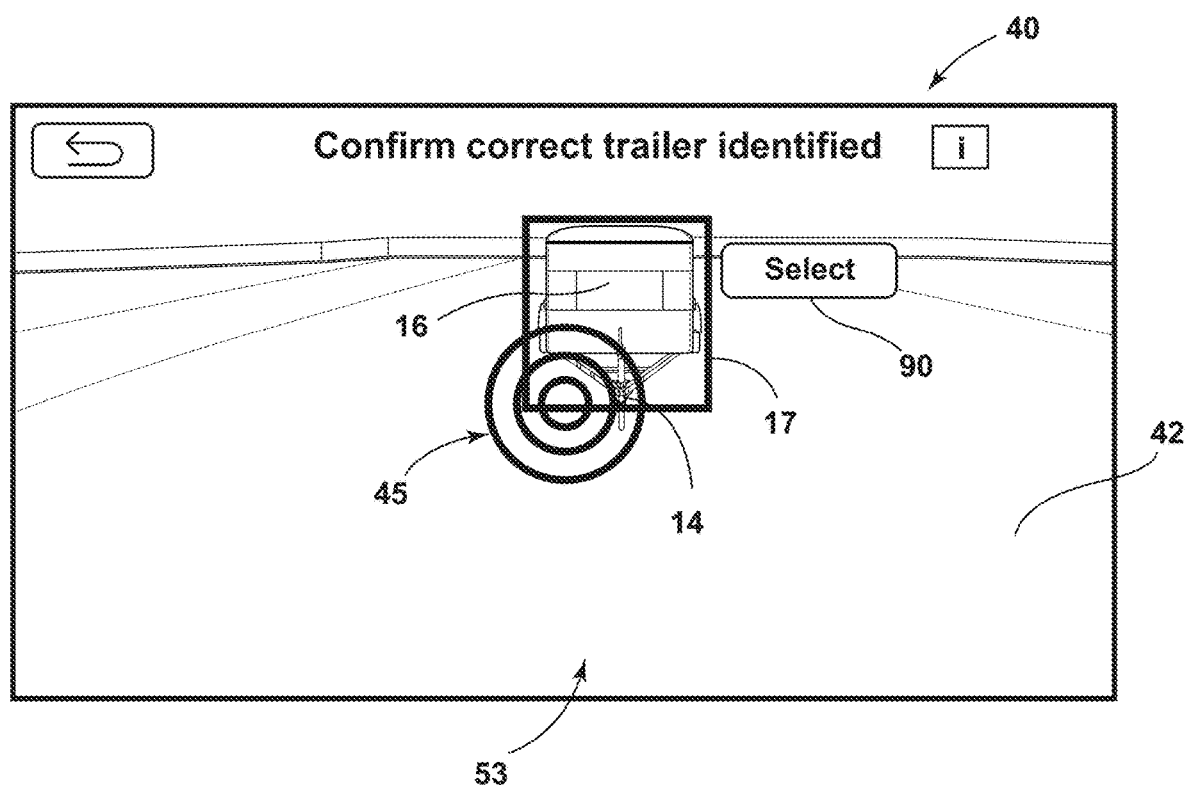
FIG. 4 is a depiction of an image received from a vehicle camera during an alignment sequence step with a target overlaid thereon.

The image processing routine 64 can be specifically programmed or otherwise configured to locate a particular coupler 14 of a subject trailer 16a within image data 55 that may include multiple trailers (such as trailers 16b-16f in FIG. 5). In the example of FIGS. 4-7, the image processing routine 64 can first attempt to identify any trailers 16 within the image data 55, which can be done based on stored or otherwise known visual characteristics of trailer 16, of a number of different types, sizes or configurations of trailers compatible with system 10, or trailers in general. When a single trailer, such as trailer 16 in FIG. 4 is identified, system 10 may cause an indication of such identification to be presented to the user via the vehicle HMI, including the box 17 shown in FIG. 4, which can be superimposed on the image presented on HMI 40 by or based on an output from controller 26. In connection with such an identification and indication 17 of trailer 16, controller 26 can seek confirmation from the user that the identification of the trailer 16 is accurate and is the correct trailer for which to complete an automated hitching operation, as described further below. In the illustrated example, a graphical button 90 can be presented on HMI 40 adjacent the trailer indication box 17 and the user can be requested to confirm the trailer identification before controller 26 proceeds with the automated hitching operation.

Figure 6:
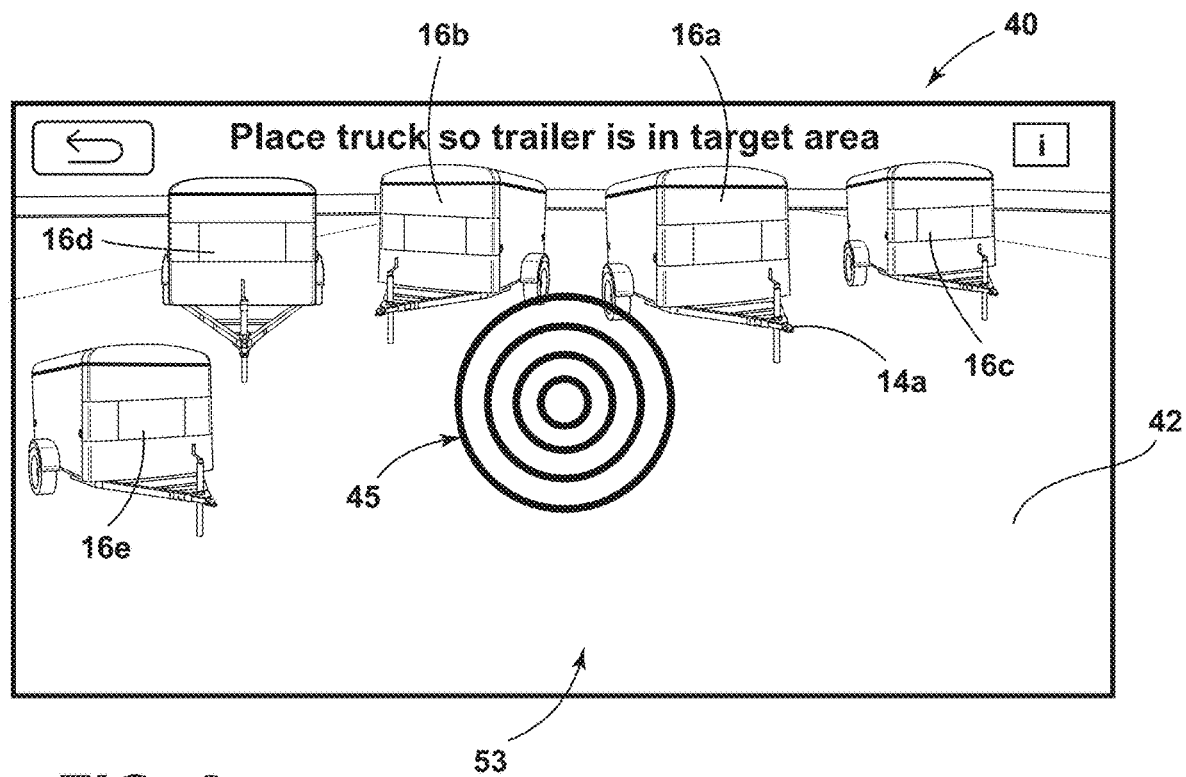
FIG. 6 is a depiction of an image received from a vehicle camera during a sequence step including identifying a subject trailer with a target overlaid on the image.

In a similar example, shown in FIGS. 5-7, controller 26 can be capable of identifying multiple trailers 16a and 16b within the image data 55 or a portion thereof, as discussed further below, with corresponding identification boxes 17a, 17b and selection buttons 90a, 90b presented for the user to select the subject trailer 16a or 16b for hitching. In particular, as shown in FIG. 5, a number of different trailers 16a-16f can be positioned in the general area of vehicle 12, including in positioning relative to vehicle 12 such that at least some (e.g., trailers 16a-16e) of the plurality of trailers 16a-16f are within the field of view 49 of camera 48 and, therefore, within the image data 55 both presented as the image 55 on screen 42, as shown in FIG. 6, and used by controller 26 in image processing routine 64 for trailer and coupler identification and location. In this manner, system 10 implements a process to communicate the identification of at least some of the trailers 16a-16e within the image data 55 to the user and to allow the user to select/confirm the particular one of such identified trailers as a "subject" trailer for coupler 14 detection and use of the associated identified coupler for a hitching operation, examples of which are discussed herein.

Figure 7:
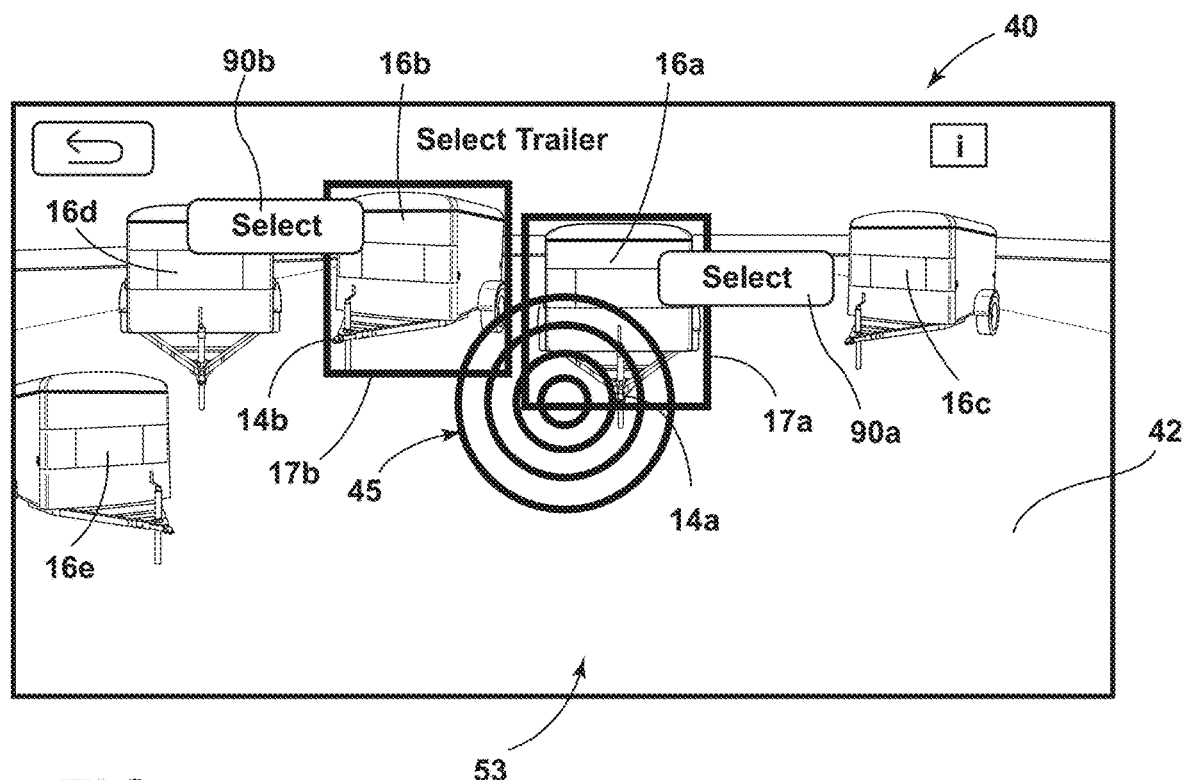
FIG. 7 is an further depiction of an image received from a vehicle camera during a subsequent identification step with the target and additional information overlaid thereon.

As shown in FIG. 7, when system 10 successfully identifies multiple trailers 16a, 16b and/or associated couplers 14a, 14b within the image data 55, it can present indications of such identification in a similar manner to that which is discussed above with respect to FIG. 5. As illustrated in FIG. 7, the indications can be presented to the user via the vehicle HMI, including respective boxes 17a, 17b, which can be superimposed on the image presented on HMI 40 by or based on an output from controller 26. In connection with the indications 17a, 17b of trailers 16a, 16b, controller 26 can allow the user to select which of the identified trailers 16a, 16b is the desired trailer for which to complete an automated hitching operation. In the illustrated example, respective graphical buttons 90a, 90b can be presented on HMI 40 adjacent the trailer indication boxes 17a, 17b and the user can be requested to select the subject trailer before controller 26 proceeds with the automated hitching operation. In the present example, such selection may be done via a touch input by the user on the screen 42 within the area of the button 90a or 90b corresponding with the indication 17a or 17b of the desired subject trailer 16a or 16b. In other examples, the user may scroll through the selection of the desired trailer 16a or 16b using a physical control (e.g., the rotatable knob 94, shown in FIG. 1) associated with the HMI 40 with a further input to enter the selection. Once the user has input the selection of the desired subject trailer 16a or 16b, system 10 can indicate the selection, for example, by removing the selection buttons 90a, 90b and the indication 17a or 17b of the non-subject trailer (16b and indication 17b in the illustrated example), while leaving the indication 17a of the subject trailer 16a present in the video image 53. In a further example, the indication 17a of the subject trailer 16a may change color (e.g., green to blue) once system 10 has received the selection from the user. As discussed in greater detail below system 10 may be able to identify additional or fewer of the trailers 16a-16e present in the image data 55 and may present additional indications of such identified trailers, according to additional examples discussed herein.

After the trailer 16 is identified, controller 26 may then identify the coupler 14 of that trailer 16 within the image data 55 based, similarly, on stored or otherwise known visual characteristics of coupler 14 or couplers in general. Additionally or alternatively, controller 26 may seek confirmation of the determined coupler 14, via a prompt on touchscreen 42 similar to the box 17 used to prompt for confirmation the trailer 16. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 12 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

Figure 8:
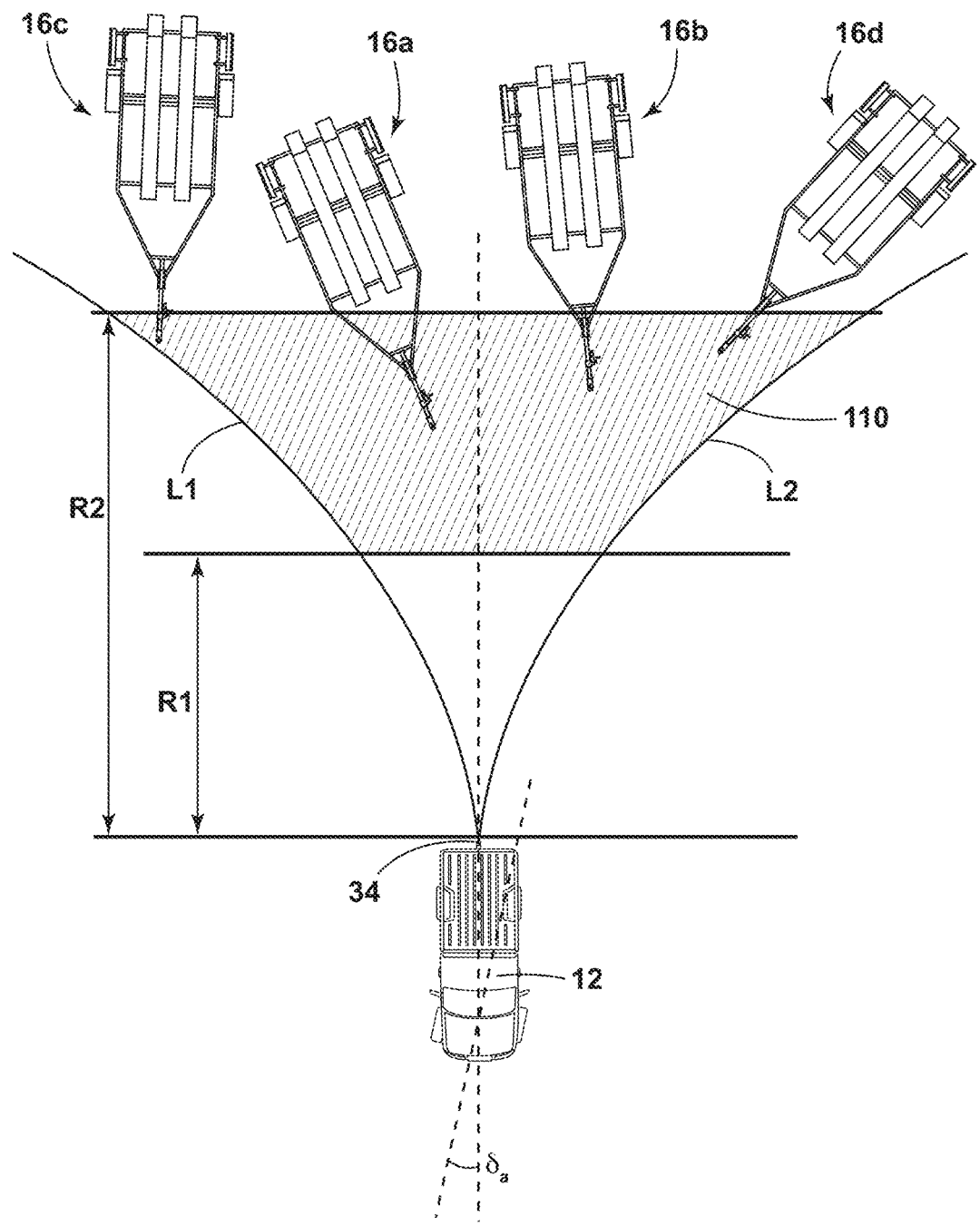
FIG. 8 is a schematic depiction of a valid zone for trailer identification based on alignment with a vehicle including a system according to FIG. 2.

As shown in the schematic example of FIG. 8, the initial determination of the position 28 of any potential subject trailer 16a-16f to an accepted level of accuracy may be needed for execution of the path derivation routine 66 and subsequent automated backing of vehicle 12 along the path 32. Various characteristics or limitations of system 10 may impact the ability of system 10 to identify the trailers 16a-16f (as well as the coupler 14, whenever such identification is carried out) in the data 55 received from imaging system 18 under certain conditions or in certain settings. Still further, various vehicle 12 or other system 10 characteristics may impact the ability of system 10 to navigate to reach a subject trailer 16a-16f that is, nevertheless, present within the image data 55. Depending on the particular configuration of system 10, such characteristics can be partially driven by the imaging system 18 used by system 10. The imaging system 18 may be limited in its ability to identify any or all of trailers 16a-16f and/or the associated couplers 14a-14f within the entire field of the image data 55. In an example, it may be assumed, at least for simplicity of illustration, that system 10 only uses rear camera 48 for trailer 16 and coupler 14 detection, with rear camera 48 having a field of view 49 that is included in its entirety in the "total field" of the image data 55 (notably, if additional cameras 50,52a, 52b are used, the total field of the image data 55 would include the entire assembled image from all such utilized cameras). The imaging system 18 limitations may limit overall system 10 functionality to only a limited distance between trailer coupler 14 and the vehicle 12, as different factors may limit the ability of controller 26 in identifying a trailer 16 or its coupler 14 when the trailer 16 and vehicle 12 are too close together or too far apart. For example, the resolution of the various cameras 48,50,52a, 52b in imaging system 18 may impact the ability to identify any trailers 16a-16f or couplers 14a-14f beyond a maximum distance R1 from vehicle 12 with the particular value of R1 being influenced by ambient conditions, including available light and/or weather conditions (e.g., rain or snow).

Additionally, a minimum distance R2 for trailer 16 or coupler 14 detection may be realized because certain implementations of system 10 may rely on dynamic readings (such as of the ground surface behind vehicle 12 or other features visible around coupler 14) to calibrate system 10 and or to track vehicle 12 speed in reversing and to track the position of coupler 14 during system 10 operation. In particular, in the above example where only rear camera 48 is used by system 10, it may be necessary to detect motion within the field of view 49 to identify distance to the subject coupler 14 and to provide accurate tracking and boundary resolution (an aspect of image processing routine 64). Further, the operating routine 68 may include a longitudinal control algorithm that relies on precise control of the vehicle 12, and a minimum amount of travel distance corresponding with R2 in an example, is required to calibrate certain braking and powertrain variables to achieve such vehicle control. Still further, if a trailer 16 is too close to vehicle 12, various features of the trailer 16 may appear as trailers themselves to the image processing routine 64, meaning that to assist system 10, the trailer 16 should be beyond the minimum distance R2 such that a proportionality of features, including of trailer 16 itself as well as of trailer 16 relative to the total field of image data 55, is optimized for image processing routine 64 functionality.

Additionally, other limitations of system 10 functionality may add constraints to the acceptable zone of operation. In this respect, system 10 may not be capable of maneuvering vehicle 12 towards all locations in an initial view of the rear camera 48 (i.e., during trailer 16 or coupler 14 identification). In particular, system 10 is restricted in its ability to reach a potential target position due, but not limited, to a lateral span that is a function of a distance range and the steering angle δ limitations of vehicle 12. In one aspect, the maximum steering angle $\delta_{max}$ of the vehicle 12 determines the lateral range, as a function of distance $D_c$ to coupler 14, as discussed further below. In general, an implementation of system 10 may restrict maneuvering of vehicle 14 to a single reversing motion that, while potentially including steering in both the left and right directions, does not incorporate forward driving of vehicle 12 between successive instances of reverse driving, for example. In this manner, the maximum lateral distance that can be traversed by vehicle 12 in an automated hitching operation is limited by the maximum steering angle $\delta_{max}$. As the vehicle 12 travels laterally by turning the steered wheels 76 and reversing, the lateral limits of system operability 10 are determined as, essentially, a theoretical hitch ball 34 path extending rearward of the vehicle corresponding with steering of vehicle 12 at the maximum steering angle under reversing of vehicle to either side. In this manner, the lateral limits of system 10 may extend outwardly from vehicle 12, with increasing distance away from vehicle 12. In a further aspect, the steering angle δ may be limited to an angle $\delta_a$ that is lower than maximum steering angle $\delta_{max}$ based on predetermined constraints for allowable swing of the front end of vehicle 12. In this manner, the lateral limits of system 10 functionality may be further limited.

Because of these limitations, the present system 10 may be configured to only function with trailers 16a-16f and associated couplers 14a-14f positioned inside a "valid" region of space relative to the vehicle 12. The region is determined by the factors listed above, and, potentially, any additional factors that affect the system 10 capability. To ensure such positioning of vehicle 12 relative to a subject trailer, such as trailer 16a, among a number of trailers 16a-16f, system 10 can be generally configured to direct the user to position vehicle 12 relative to at least the desired subject trailer 16a such that trailer 16a is within such a valid area of the field of view of the utilized cameras, such as field of view 49 of rear camera 48, and the corresponding image data 55. As shown in FIG. 6, this direction may be given by way of presenting a target 45 as a graphical overlay on a real-time video image 53 of the image data 55 from one or more of the cameras 48,50,52a, 52b in imaging system 18 presented on screen 44. The target 45 may be derived and/or presented on screen 44 according to various characteristics of system 10 described above and may balance these characteristics and system requirements to provide widely useable functionality of system 10, overall. In this manner, the target 45 be positioned within the image 53 in a location that is determined to correspond with an actual location relative to vehicle 14 relative to the ground plane 30 on which vehicle 12 is positioned (and on which the trailers 16a-16f may be assumed to be present, regardless of actual ground characteristics) that is within the valid zone for trailer 16 and coupler 14 detection and vehicle 12 navigation for alignment therewith. In the example shown, the target 45 may not directly correspond with the complete area within which such detection and navigation is possible, but may rather be a general area that is reliably within the acceptable zone, and requires placement of any of the couplers 14a-14f and/or trailers 16a-16f within a certain distance from vehicle 12, including within a maximum and minimum distance from vehicle 12, as well as within a predetermined maximum lateral offset from vehicle 12. As shown, this may result in the target 45 being positioned generally centrally within the image 53 in both the horizontal and vertical directions and may represent, for example about 5-15% of the total area of image 53. In some instances, target 45 may not be exactly centered within image 53, at least in the vertical direction, with target 45 potentially being centered between about 30% and 50% of the vertical distance of image 54. In various examples, the positioning of the particular camera(s), such as camera 48, on vehicle 12, as well as the characteristics (focal length, etc.) of the camera(s).

The particular interaction between the user and system 10 guided by way of the above-described target 45 can vary based on a desired process for identification and selection of a subject trailer (e.g., trailer 16a) among a plurality of trailers 16a-16e (for example). In one example, when initiated, system 10 can automatically attempt to identify any of the trailers 16a-16e within the area of target 45, which may include any trailers 16a-16e fully within the target area or partially within the target area 45, depending on the target size 45 and other system parameters or trailer characteristics (including, for example, whether the associated coupler 14 is within the target 45). Simultaneously, system 10 may prompt, via HMI 40, the driver to position vehicle 12 such that the coupler 14a-14e of the desired subject trailer 16a-16e (or just the desired subject trailer 16a-16e) is within the area of target 45. When any of the visible trailers 16a-16e, are detected (which would generally coincide with positioning thereof within the area of target 45), system 10 can indicate such an identification, as discussed above. In the illustrated example, both trailers 16a and 16b are within the target area 45 by an acceptable amount such that they are identified by system 10. Such identification, as discussed above, is indicated by highlighting the trailers 16a, 16b with boxes 17a, 17b (FIG. 7), while instructing the driver to select the desired subject trailer (by pressing the corresponding button 90a or 90b, for example). Additionally, system 10 can instruct the driver to reposition vehicle 12 to move another trailer 16c-16d into the target area 45 for selection of another such trailer. When as selection is made vehicle 12, according to various potential interactive schemes, can acquire control of vehicle 12 from the user and can control vehicle 12 in aligning hitch ball 34 with coupler 14 for hitching of vehicle 12 with the trailer 16.

Figure 9:
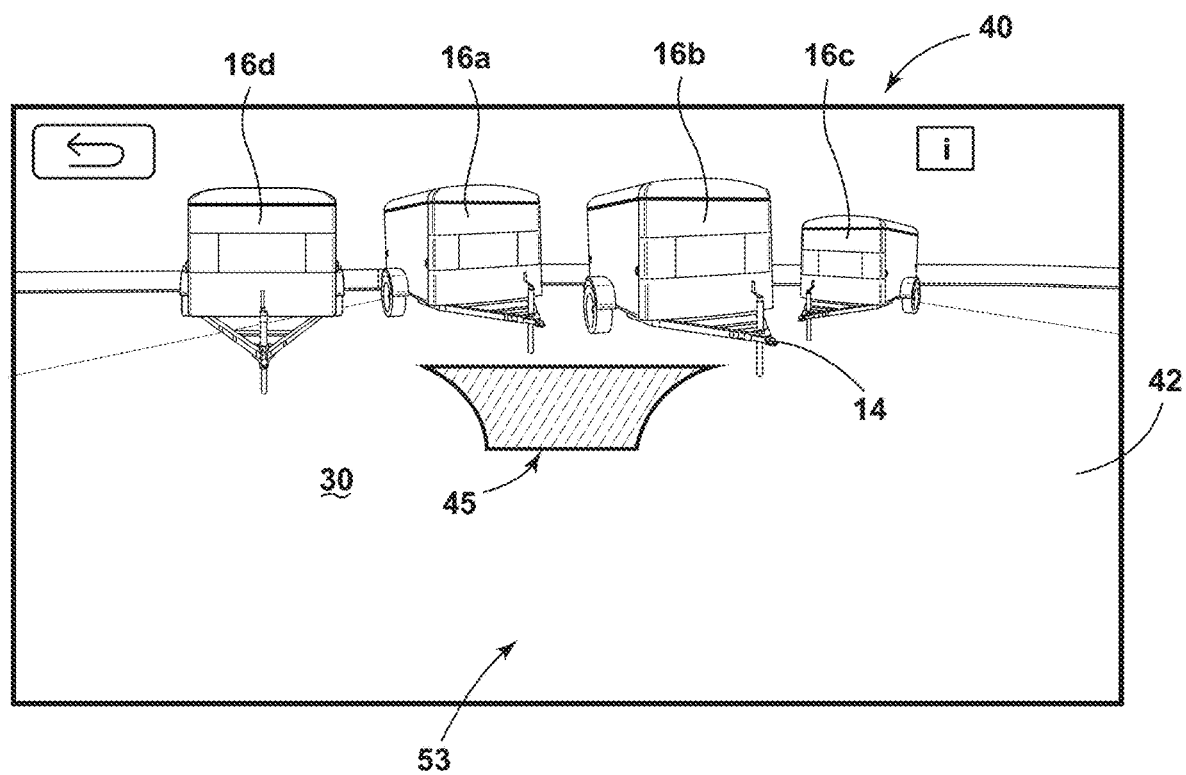
FIG. 9 is a depiction of an image received from a vehicle camera during an alternative identification step with an alternative target overlaid thereon.
Figure 10:
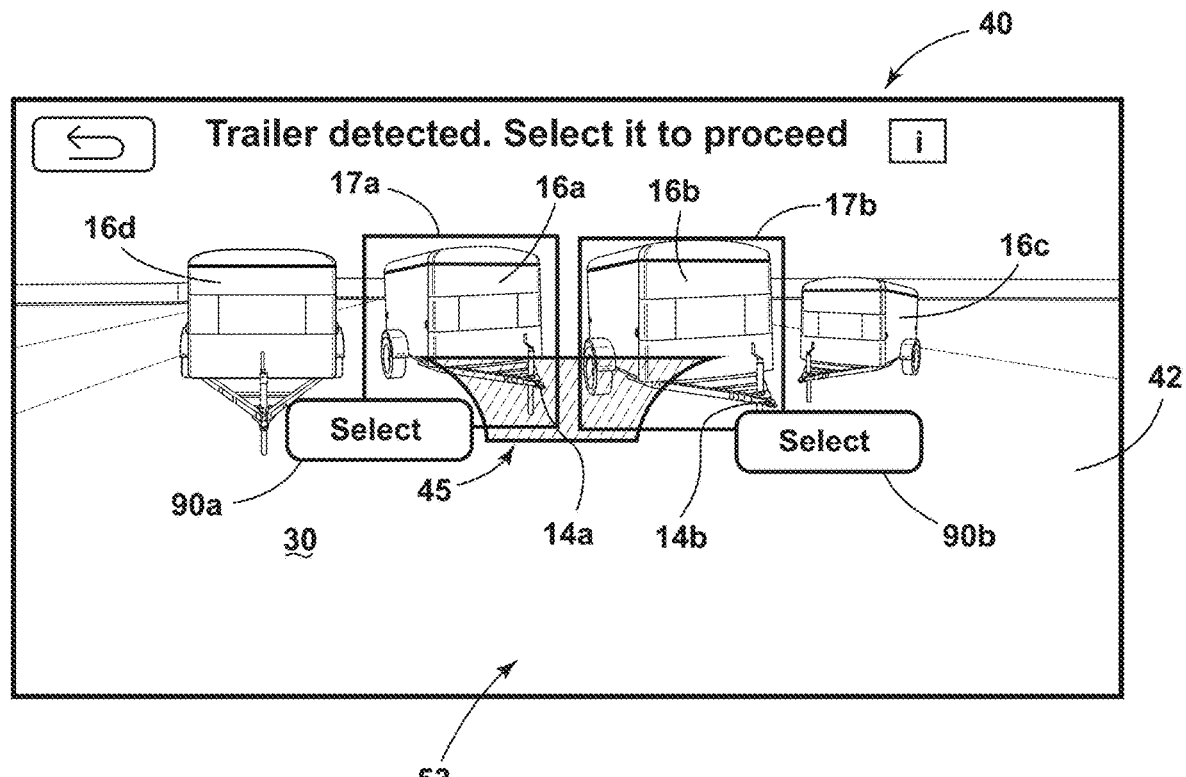
FIG. 10 is an further depiction of a subsequent image received from a vehicle camera during a subsequent identification sequence step with the target and additional information overlaid thereon.

Turning to FIGS. 9 and 10, an additional example of executing the above-described guidance of the user to an initial vehicle 12 alignment with the desired subject trailer 16 of a number of trailers 16a-16e in an initial acceptable zone is described. As shown, the target 45 may be displayed in a shape that more directly corresponds with the actual acceptable zone for trailer 16 and coupler 14 positioning relative to vehicle 12, which may provide increased flexibility and greater understanding of the system 10 requirements for the user compared to the generalized target of FIGS. 6 and 7. As discussed above, the visibility requirements of the operating routines 64,66,68 may dictate that a desired subject trailer 16 (or at least coupler 14) be positioned between a longitudinal range between limits R1 and R2 that correspond with distance from the vehicle 12, as shown in FIG. 8. As also shown in FIG. 8, the lateral range for the acceptable zone extends between the lateral limits L1 and L2, which as discussed above extend outwardly from the hitch ball 34 along "maximum steerable" paths corresponding with a maximum or maximum allowed steering angle $\delta_{max}$ or $\delta_a$ in both the left and right directions. In this manner, the acceptable zone 110 is an area along the ground plane 30 that is within both the longitudinal range and the lateral range and is, therefore, an area bounded by respective portions of the longitudinal limits R1,R2 and the lateral limits L1,L2.

As shown in FIGS. 9 and 10, in an example, the target 45 can be presented on screen 42 as an overlay on the video image 53 displayed using the image data 55 that approximates the acceptable zone 110 on the image 53. In this manner, the respective portions of the ranges R1,R2,L1,L2 bounding the acceptable zone 110 can be graphically represented on screen 42 in a manner that correlates the acceptable zone 110 on the actual ground plane 30 with the view on the screen 42 based on the properties of camera 48, for example, and the position thereof to arrive at a perspective projection of the acceptable zone that at least reasonably appears as an area of the ground visible on the screen 42. In this manner, the user may position vehicle 12 such that at least the desired subject trailer 16a is within the target 45 corresponding with the acceptable zone 110. In the example illustrated in FIG. 10, once such positioning is achieved and system 10 detects, for example, trailers 16a and 16b within the acceptable zone 110 or aligned with target 45, the indications 17a and 17b of trailers 16a and 16b can be overlaid in connection therewith within image 53 and buttons 90a and 90b can be displayed for user confirmation of the intended trailer 16. In a further variation, the target 45 image may be inverted such that the graphic overlay corresponds with an "invalid" zone for trailer positioning, as discussed in further detail in the co-pending, commonly-assigned U.S. Patent Application filed under Ser. No. 16/038,398, the entire disclosure of which is incorporated by reference herein.

In either of the illustrated target 45 depictions of FIGS. 6 and 7 and FIGS. 9 and 10, system 10 can provide indication and allow selection of a subject trailer 16 of a number of trailers 16 according to various alternative schemes. In one example, system 10 may, upon activation, wait for a user indication of the subject trailer 16*a* via a touch input on screen 42 (i.e. without presenting the target 45 on screen 42). If possible, the system 10 can identify the subject trailer 16*a*, for example, using image processing routine 64 in connection with the touch input. If the trailer 16*a* is identified, system 10 can analyze the trailer 16*a* position and can determine whether trailer 16*a* is in the valid zone 110. If the trailer 16*a* is not in the valid zone 110 (such as by being beyond either lateral limit L1,L2), or cannot be identified at all (indicating, potentially, that the trailer is outside of the longitudinal range), system 10 can then present the target 45 on screen 42 and instruct the driver to reposition the vehicle 12 accordingly, while maintaining the tracking of the trailer 16*a* (if detected) until trailer 16*a* is in the valid zone 110. In a further, variation, system 10 can place indications 17 on all trailers that can be identified, including within a threshold that may not be suitable for guidance, such as when a trailer 16 is identified by system 10 but is beyond either longitudinal limit R1,R2, or when a reliably identified trailer 16 is beyond the lateral limits L1,L2 of the acceptable zone 110. In this manner, the identified trailers (e.g. trailers 16*c*-16*e* in FIG. 10) could have associated indicators that are of a different color than the indicators 17*a*, 17*b* associated with trailers 16*a*, 16*b* within the acceptable zone 110 or can otherwise indicate that the trailers are not presently selectable (e.g., by being crossed or x-ed out or by not having graphical buttons associated therewith). In a further variation, if a user attempts to select such a trailer 16*c*-16*e* (e.g., by a touch input on screen 42 in the area of one of the trailers 16*c*-16*e*), system 10 can present on screen 42 an indication that the trailer cannot be selected and that the vehicle 12 can be repositioned to place the trailer within the target 45 area for selection. In such a variation, system 10 can track the identified trailers 16*a*-16*e* as vehicle 12 moves on ground plane 30 and can change any indications associated with the identified trailers 16*a*-16*e* as they move in and out of the acceptable zone 110 relative to vehicle 12.

Figure 11:
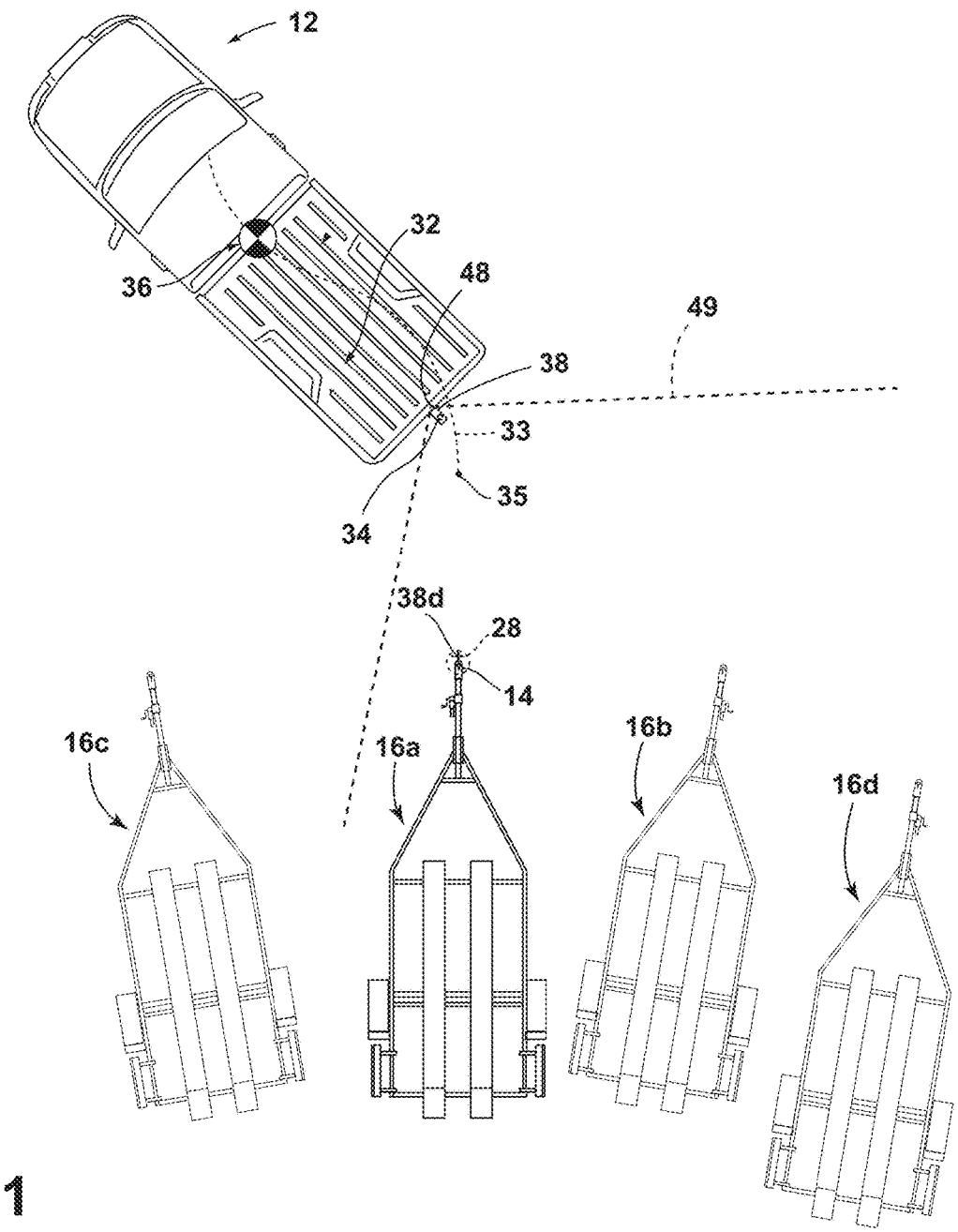
FIG. 11 is an overhead schematic view of the vehicle during a subsequent step of the alignment sequence with the subject trailer of a plurality of identifiable trailers.
Figure 12:
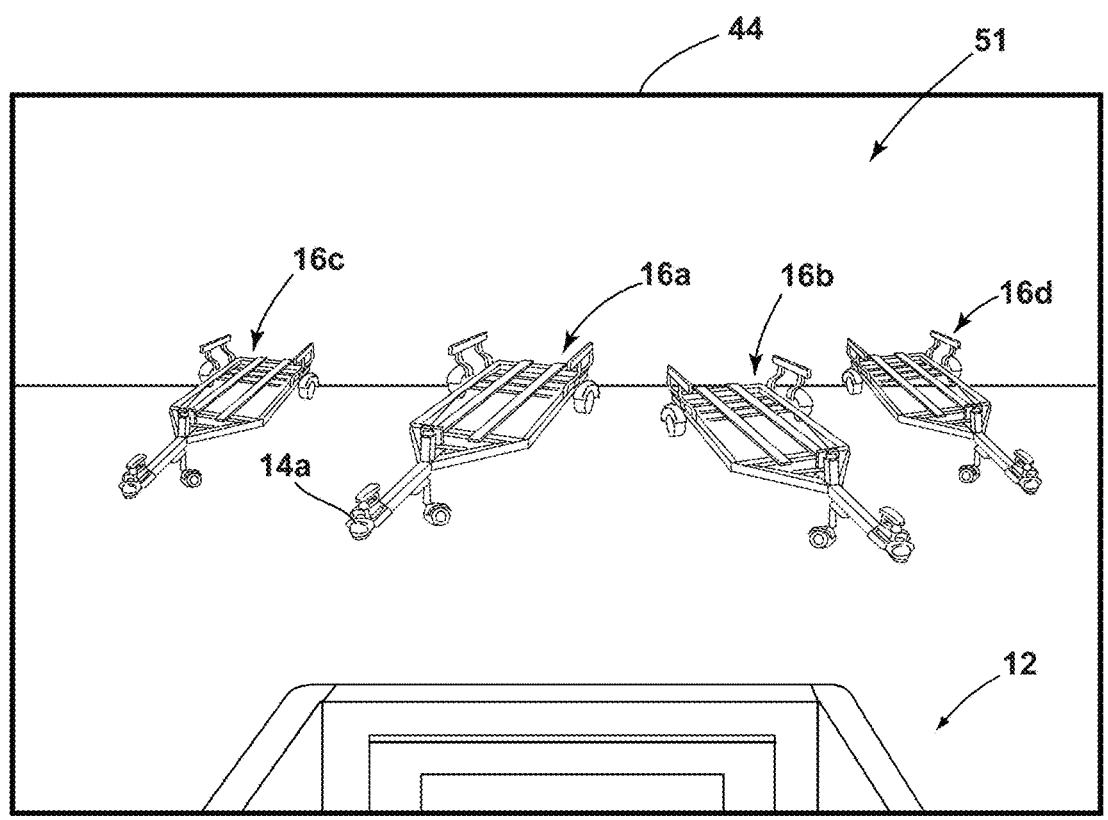
FIG. 12 is a depiction of an image received from a vehicle camera during the alignment sequence step of FIG. 11.
Figure 13:
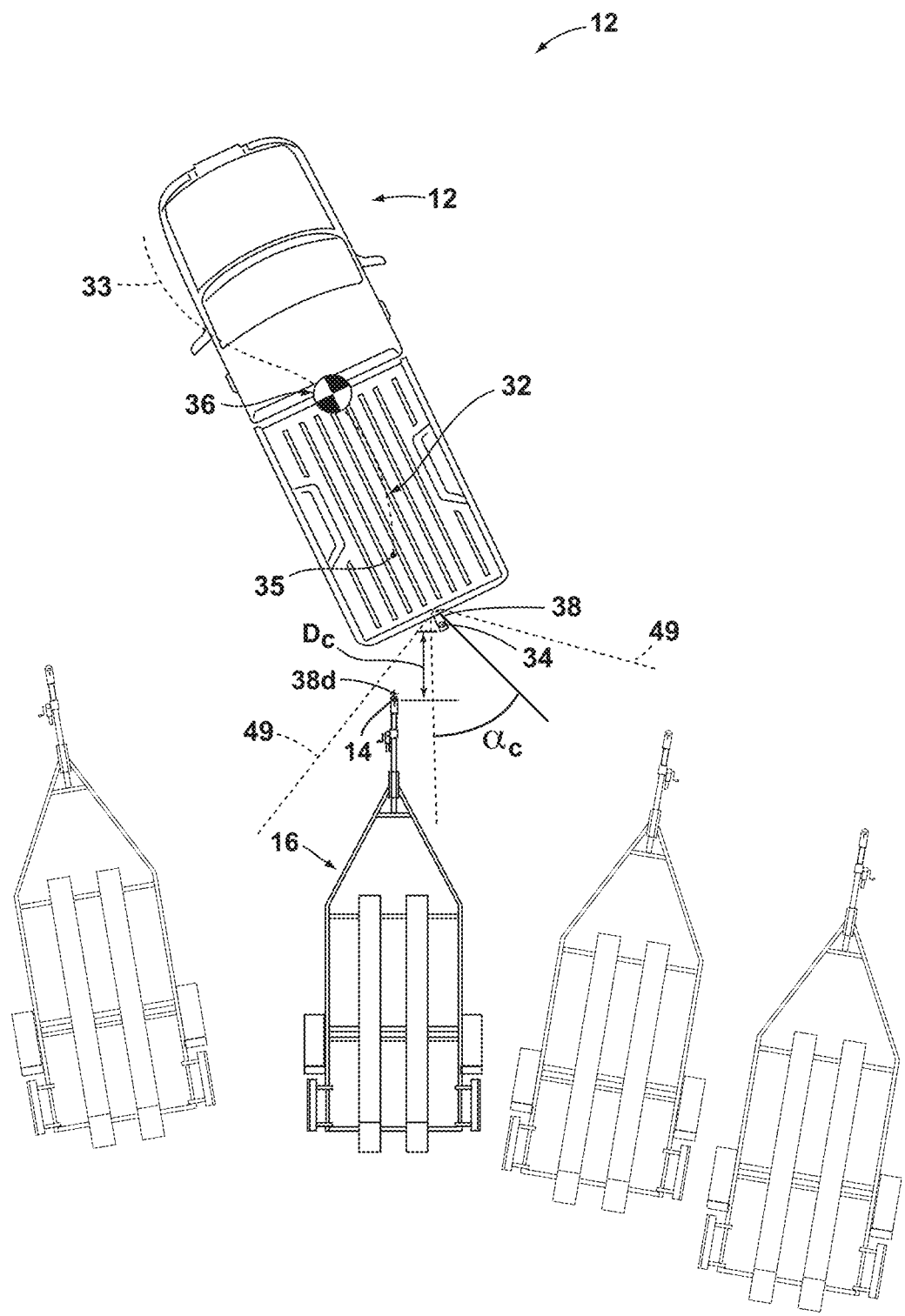
FIG. 13 is an overhead schematic view of the vehicle during a subsequent step of the alignment sequence with the trailer.
Figure 14:
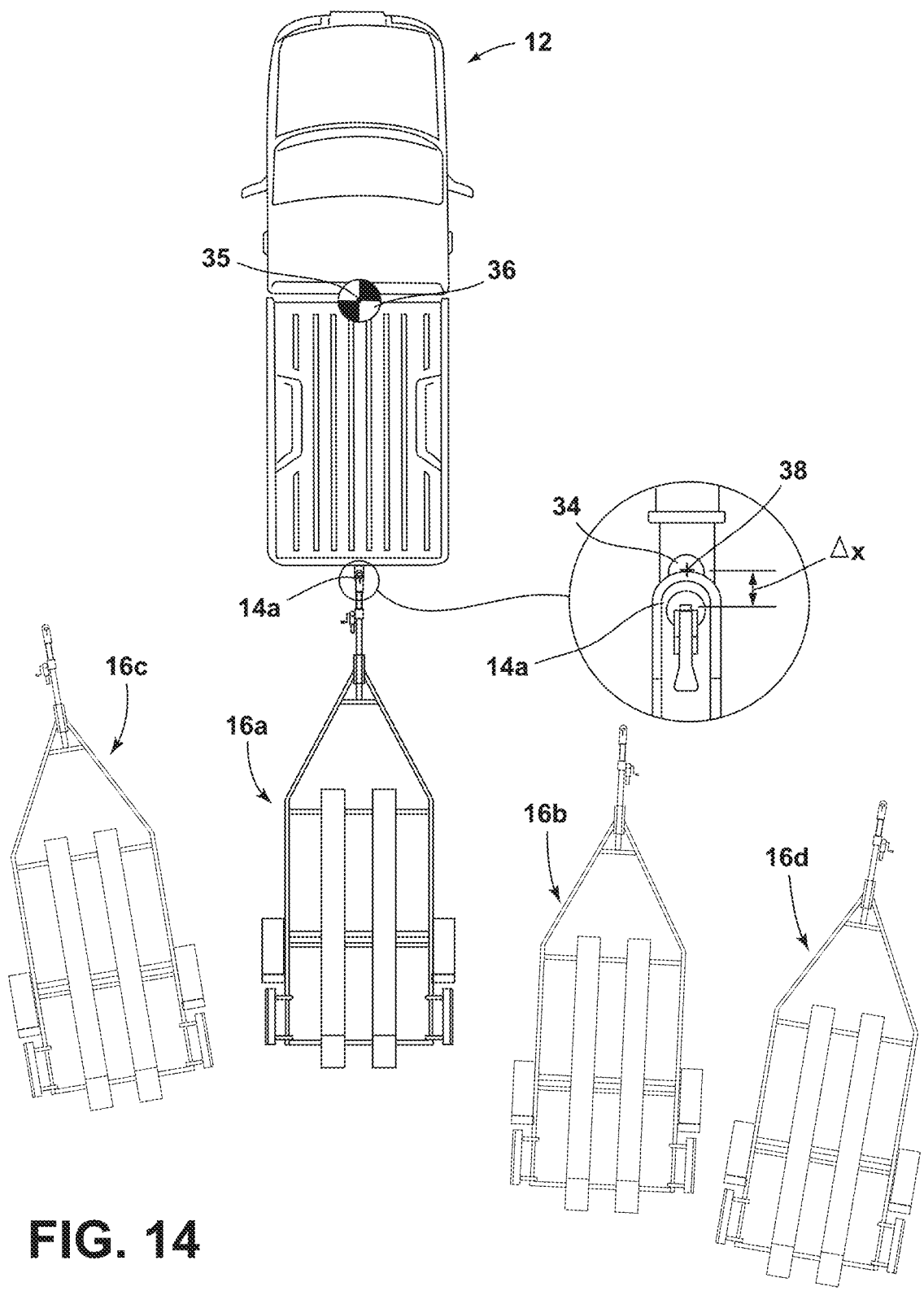
FIG. 14 is an overhead schematic view of the vehicle during a subsequent step of the alignment sequence with the trailer and showing the position of a hitch ball of the vehicle at an end of a derived alignment path.

Turning now to FIGS. 11-14, once the subject trailer 16*a* and associated coupler 14*a* have been identified, and system 10 determines the path 32 to align hitch ball 34 with the coupler 14*a*, the operating routine 68 may continue to guide vehicle 12 until hitch ball 34 is in the desired position 38$_d$ relative to coupler 14*a* for coupler 14 to engage with hitch ball 34 when coupler 14 is lowered into horizontal alignment therewith. In the example discussed above, image processing routine 64 continuously monitors the positioning $D_c, \alpha_c$ of coupler 14*a*, constantly or once available, during execution of operating routine 68, including as coupler 14*a* comes into clearer view of rear camera 48, as shown in FIG. 12, with continued movement of vehicle 12 along path 32, as shown in FIG. 11. As discussed above, the position of vehicle 12 can also be monitored by dead reckoning device 24 with the position 28 of coupler 14*a* being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16*a*, as shown in FIG. 13. Still further, the coupler 14*a* can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c, \alpha_c$ of coupler 14*a* to converge the known relative position of hitch ball 34 to the desired position 38*d* thereof relative to the tracked position 28 of coupler 14*a*, as discussed above and shown in FIG. 23.

Figure 15:
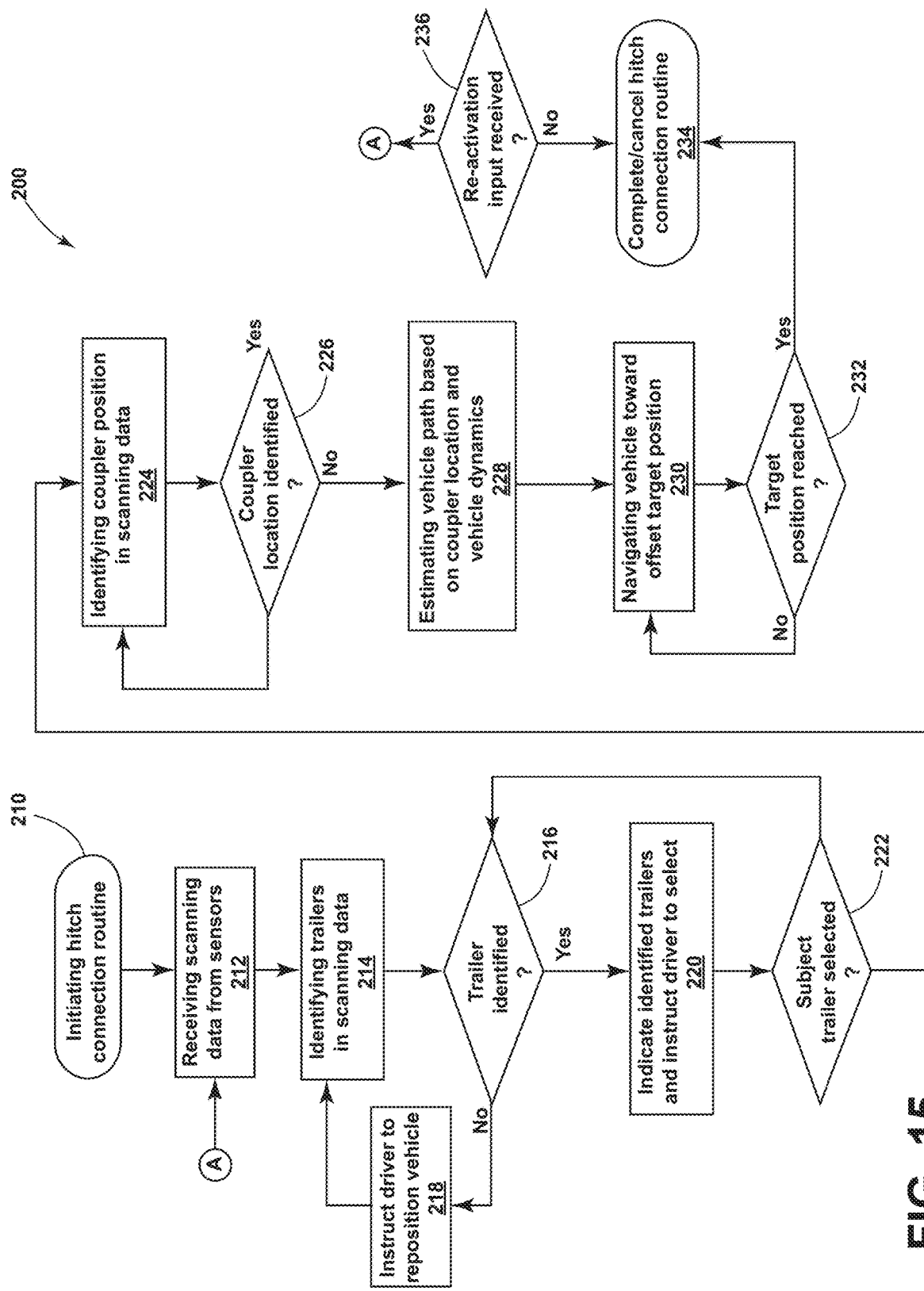
FIG. 15 is a flowchart depicting steps in the alignment sequence.

Turning now to FIG. 15, a flowchart showing steps in using hitch assist system 10 to align a vehicle hitch ball 34 with a coupler 14*a* of a subject trailer 16*a* is shown. In particular, in step 210, the hitch assist system 10 is initiated. Once the hitch assist system 10 is initiated 210, controller 26 can use imaging system 18 to scan the viewable scene using any or all available cameras 48, 50, 52*a*, 52*b* (step 212). The scene scan (step 212) can be used to then identify 214 any trailers 16*a*-16*e*, for example within the image data 55. If no trailers are identified, system 10 can instruct 216 the driver to reposition the vehicle 12 so that the desired trailer 16*a* is within the target area 45 (according to any of the various examples above). Alternatively, if one or more trailers 16*a*, 16*b*, for example, are identified, system 10 can indicate 218 the identified trailers 16*a*, 16*b* and can instruct the user to select one of multiple trailers or to confirm the identification of a single trailer. Once a subject trailer 16*a* is selected or confirmed, system 10 can identify 220 the coupler 14*a* associated with the subject trailer 16*a* (which may also be confirmed by the user).

If the coupler 14 can be identified in the image data 55, the height $H_c$ distance $D_c$, and offset angle $\alpha_c$ of coupler 14, as identified in step 214, can then be determined using the available image data 55 (step 222) as discussed above, including using image processing routine 64. As discussed above, image processing routine 64 can be programmed or otherwise configured to identify coupler 14 of trailer 16 within image data 55 (step 214). In this manner, after the results of the initial scene scan (step 212) are analyzed, controller 26 can determine if coupler 14 has been confirmed by the user (such as by way of HMI40). If coupler 14 has not been confirmed or if a determined coupler 14 has been rejected, the scene scan (step 212) can be continued, including while instructing driver to move vehicle 12 to better align with trailer 16, including by positioning the trailer 16 and/or coupler 14 within any of the above-descried targets 45, until coupler 14 is identified.

When coupler 14 has been identified and confirmed, the path derivation routine 66 can be used to determine the vehicle path 32 to align hitch ball 34 with coupler 14 in step 222. In this manner, the positioning $D_h, \alpha_h$ of coupler 14 is extracted from the image data 55 and used to place the coupler 14 within the stored data relating the image coordinates with the real-world coordinates of the area surrounding vehicle 12. In doing so, controller 26 uses path derivation routine 66 to determine path 32 to align hitch ball 34 with the predicted position 28 of coupler 14 to an engaging position over hitch ball 34, as described above with respect to FIGS. 11-14.

Once the path 32 has been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68). When it has been confirmed that user U is not attempting to control steering system 20 (for example, using torque sensor 80, as discussed above), controller 26 begins to move vehicle 12 along the determined path 32. Hitch assist system 10 then controls steering system 20 (step 224) to maintain vehicle 12 along path 32 as either user U or controller 26 controls the velocity of vehicle 12 using powertrain control system 72 and braking control system 70. As discussed above, controller 26 or the user can control at least steering system 20, while tracking the position $D_c$, $\delta_c$ of coupler 14 until vehicle 12 reaches endpoint 35 (step 226), wherein the vehicle 12 hitch ball 34 reaches the desired position $38_d$ for the desired alignment with coupler 14, at which point operating routine 68 can end (step 228), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10 (step 230). Vehicle 12 can then be driven normally with system 10 remains idle until a reactivation input 232 is received, at which point the above-described method restarts at the scanning step 212.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitching assistance system for a vehicle, comprising:
a human-machine interface within the vehicle; and
a controller:
  acquiring image data from the vehicle;
  identifying a plurality of trailers within the image data;
  indicating, via the human-machine interface, that at least one of the plurality of trailers is at least one reachable trailer by the at least one trailer being positioned within a specified area of the image data, the specified area being less than a total field of the image data and defined by left and right steering angle limits of the vehicle;
  receiving a selection, via the human-machine interface, of a subject trailer of the at least one reachable trailer within the specified area;
  identifying a coupler of the subject trailer; and
  autonomously steering the vehicle to align a hitch ball of the vehicle with the coupler of the subject trailer.

2. The system of claim 1, wherein the controller further outputs a video image displayable on a human-machine interface within the vehicle including:
the image data; and
a plurality of graphic trailer identification images overlaid on the image data in respective positions adjacent each the at least one reachable trailer within the specified area.

3. The system of claim 2, wherein at least one of the plurality of trailers identified within the image data as an additional trailer outside the specified area; and
the controller does not include an identification image overlaid on the image data in association with the additional trailer.

4. The system of claim 2, wherein the controller receives an input from the human-machine interface corresponding with a user input associated with one of the plurality of identification images, such input being received as the selection of the subject trailer.

5. The system of claim 1, wherein the total field of the image data corresponds with a total field of view of the camera.

6. The system of claim 1, wherein the specified area of the image data is a target area disposed within a central portion of the image data.

7. The system of claim 1, wherein the controller further outputs a video image displayable on the human-machine interface within the vehicle including:
the image data; and
a graphic overlay of the specified area on the image data in a proportionally correlated manner.

8. The system of claim 7, wherein the controller:
receives an input from the human-machine interface corresponding with a portion of the image data outside of the specified area; and the selection of the subject trailer; and
includes in the graphic overlay an instruction to reposition the vehicle so that an indicated trailer is within the specified area.

9. The system of claim 1, wherein the specified area of the image data is further defined by at least one of a minimum travel threshold and a maximum image detection limit.

10. The system of claim 1, wherein:
the controller outputs the steering signal to a steering system included with the vehicle; and
the controller derives the steering signal based on at least one of the left and right steering angle limits.

11. A vehicle, comprising:
a steering system;
a human-machine interface within the vehicle;
a camera positioned on an exterior of the vehicle; and
a controller:
  acquiring image data from the camera;
  identifying a plurality of trailers within the image data,
  indicating, via the human-machine interface, that at least one of the plurality of trailer is at least one reachable trailer by the at least on trailer being positioned within a specified area of the image data, the specified area being less than a total field of the image data and defined least by left and right steering angle limits of the vehicle;
  receiving a selection, via the human-machine interface, of a subject trailer of the at least one reachable trailer; and
  autonomously steering the vehicle to align a hitch ball of the vehicle with a coupler of the subject trailer.

12. The vehicle of claim 11, wherein the controller further identifies the coupler of the subject trailer after receiving the selection of the subject trailer.

13. The vehicle of claim 11, wherein:
the controller further outputs a video image displayable on the human-machine interface including:
  the image data; and
  a plurality of graphic trailer identification images overlaid on the image data in respective positions adjacent the at least one reachable trailer identified within the specified area.

14. The vehicle of claim 13, wherein the controller receives an input from the human-machine interface corresponding with a user input associated with one of the plurality of trailer identification images, such input being received as the selection of the subject trailer.

15. The vehicle of claim 11, wherein the total field of the image data corresponds with a total field of view of the camera.

16. A method for assisting a vehicle in hitching with a trailer, comprising:
acquiring image data for a field of view away from a rear of the vehicle;

identifying a plurality of trailers within the image data;
indicating, via a vehicle human-machine interface, that at least one of the plurality of trailers is at least one reachable trailer by the at least one trailer being positioned within a specified area of the image data, the specified area being less than a total field of the image data and defined by left and right steering angle limits of the vehicle;
receiving a selection of a subject trailer of the at least one reachable trailer; and
autonomously steering the vehicle to align a hitch ball of the vehicle with a coupler of the subject trailer.

17. The method of claim 16, wherein:
the total field of the image data corresponds with a total field of view of a camera from which the image data is acquired; and
the specified area of the image data is a target area disposed within a central portion of the image data.

18. The method of claim 16, further including identifying the coupler of the subject trailer after receiving the selection of the subject trailer.

19. The method of claim 16, further including:
outputting a video image displayable on the vehicle human-machine interface including:
the image data; and
at least one graphic trailer identification image overlaid on the image data in a position adjacent the at least one reachable trailer identified within the specified area.

20. The method of claim 19, further including receiving an input from the human-machine interface corresponding with a user input associated with the at least one trailer identification image, such input being received as the selection of the subject trailer.

* * * * *